(12) United States Patent
Buchanan et al.

(10) Patent No.: US 10,506,060 B2
(45) Date of Patent: Dec. 10, 2019

(54) METHOD AND SYSTEM FOR TRACKING CHAIN OF CUSTODY ON UNSTRUCTURED DATA

(71) Applicant: Filetrek Inc., Ottawa (CA)

(72) Inventors: Keith Buchanan, Ottawa (CA); Ben Piercey, Richmond (CA)

(73) Assignee: Interset Software Inc., Ottawa (CA)

( * ) Notice: Subject to any disclaimer, the term of this patent is extended or adjusted under 35 U.S.C. 154(b) by 889 days.

(21) Appl. No.: 14/579,246

(22) Filed: Dec. 22, 2014

(65) Prior Publication Data

US 2015/0180741 A1    Jun. 25, 2015

Related U.S. Application Data

(60) Provisional application No. 61/919,976, filed on Dec. 23, 2013.

(51) Int. Cl.
*G06F 15/167* (2006.01)
*H04L 29/08* (2006.01)
*G06F 21/62* (2013.01)

(52) U.S. Cl.
CPC ...... *H04L 67/2842* (2013.01); *G06F 21/6218* (2013.01)

(58) Field of Classification Search
CPC .................. H04L 67/2842; G06F 21/6218
See application file for complete search history.

(56) References Cited

U.S. PATENT DOCUMENTS 6,850,959 B1 * 2/2005 Golds ................ G06F 3/0607
707/822
2007/0239697 A1 * 10/2007 Chen ............... G06F 17/30616

\* cited by examiner

*Primary Examiner* — Hua Fan
(74) *Attorney, Agent, or Firm* — DLA Piper LLP (US)

(57) ABSTRACT

The present invention relates to methods and file systems for tracking the chain of custody on unstructured data in a file system. More particularly, the present invention relates to methods and file systems for tracking the chain of custody between a source file and a destination file from a source file system to a destination file system.

12 Claims, 1 Drawing Sheet

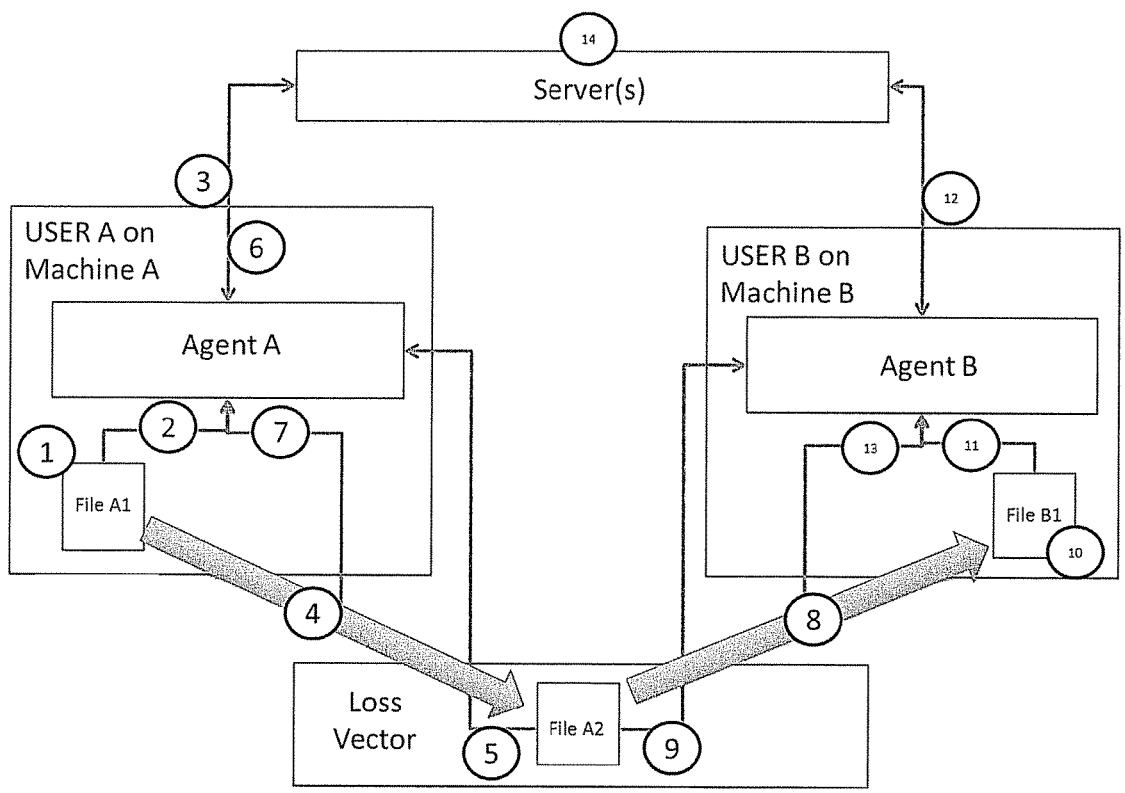

METHOD AND SYSTEM FOR TRACKING CHAIN OF CUSTODY ON UNSTRUCTURED DATA

FIELD

The present invention relates to methods and file systems for tracking the chain of custody on unstructured data in a file system. More particularly, the present invention relates to methods and file systems for tracking the chain of custody between a source file and a destination file from a source file system to a destination file system.

BACKGROUND

Modern computer-users generate a large amount of digital data every day in the form of digital files—including word processing documents, music files, digital spreadsheets, electronic pictures, among other types of well-known digital files. Accurately tracking the creation, revision, copying and transfer of digital files is a constant challenge for information technology professionals.

One of the qualities that information technology professionals often attempt to track is "custody" of a digital file—which can often described as the chronological documentation showing the seizure, custody, control, transfer and analysis and disposition or electronic evidence. In one sense, custody of a digital file is analogous to the 'paper trail' that is associated with a physical, paper file.

For example, custody of a digital file can be particularly important in modern legal proceedings where the process of electronic discovery is particularly concerned with how digital files have been stored, copied and otherwise manipulated.

Various prior art solutions have been proposed for tracking the chain of custody for a digital file. One such solution is using a digital "watermark" to inject identifying information into a digital file so that other systems that subsequently handle the digital file can examine this identifying information, thereby relating the document to a user and documenting a date and time when the document came into a particular user's possession.

However, it is not possible to watermark an object in a transient state, such as when the digital word document is displayed on a computer screen or when a music file is being played on a digital musical player. Further, many digital file formats do not support the ability to accept injected custom data from another source.

Another prior art solution involves associating additional metadata information (such as extended attributes or alternative data streams) to a digital file that includes specific information related to the chain of custody of the digital file. However, this approach has clear drawbacks as the additional metadata information is often not transferred along with the digital file when it is transferred over a network or moved to certain types of storage devices that do not support the additional metadata information.

Therefore, there is need for methods and file systems for accurately tracking the chain of custody between a source file and a destination file from a source file system to a destination file system.

This background information is provided to reveal information believed by the applicant to be of possible relevance to the present invention. No admission is necessarily intended, nor should be construed, that any of the preceding information constitutes prior art against the present invention.

BRIEF SUMMARY

The present invention provides methods and file systems for accurately tracking the chain of custody between a source file and a destination file from a source file system to a destination file system.

More specifically, in at least one embodiment the present invention provides a method of tracking the chain of custody between a source file and a destination file from a source file system to a destination file system including the steps of detecting the source file on the source file system with a source agent, retrieving and communicating a source location of the source file to a server, assigning a source identifier to the source file, caching the source identifier in the source agent and storing the source identifier in the server, detecting a first loss vector operation with the source agent, the first loss vector operation including creating a file copy corresponding to the source file, generating a first audit report corresponding to said loss vector operation, saving the first audit report to the server, detecting the location of the file copy and sending the location to the server, assigning a copy identifier to the file copy with the server, caching the copy identifier in the source agent, establishing a source link relationship between the source file and the file copy with the source agent, communicating the source link relationship to the server with the source agent, detecting a second loss vector operation with a destination agent, the second loss vector operation including copying a destination copy of the file copy from a destination system to at the source system, generating a second audit report corresponding to said loss vector operation, saving the second audit report to the server, detecting the presence of the file copy with the destination agent, retrieving a copy identifier associated with the file copy from the server and storing the copy identifier with the destination agent, creating a destination file on a destination file system, the destination file corresponding to the destination copy, detecting the creation of the destination file with the destination agent, retrieving and communicating a destination location of the destination file to the server, assigning a destination identifier to the destination file with the server, establishing a destination link relationship between destination file and the destination copy with the destination agent; and communicating the destination link relationship to the server with the destination agent.

BRIEF DESCRIPTION OF THE FIGURES

Embodiments of the present invention will be better understood in connection with the following FIGURES, in which:

FIG. 1 is a flow diagram of at least one embodiment of a method for tracking the chain of custody between a source file and a destination file from a source file system to a destination file system.

DETAILED DESCRIPTION OF THE EMBODIMENTS

The present invention provides methods and systems for tracking the chain-of-custody on unstructured data on a file system. More specifically, in at least one embodiment the present invention provides methods for tracking a link relationship between a source file on a source file system, and a destination file on a destination file system. It is contemplated that in at least one embodiment the destination file is a copy of the source file.

For the purposes of the present disclosure, the term "chain-of-custody" is contemplated as the chronological documentation of all file operations that can occur to a digital data file that will be readily understood by the skilled person. For the purposes of the present disclosure, a file operation can be any access, editing, visual display, modification, custody, transfer, or any other known file action, either performed by a user, the file system, or another device that will be readily understood by a skilled person.

"Unstructured data" and, analogously, a "file" are contemplated to mean any digital data file that is suitable for use in connection with the present invention, including digital video and music files, digital word documents, spreadsheets and slide presentations, encrypted and unencrypted digital files, compressed and uncompressed digital files, among any other type of digital file that will be readily understood by the skilled person. In at least one embodiment, it is contemplated that the unstructured data does not support custom injected data, alternative data streams or extended file attributes, however it is also contemplated that "Unstructured data" and a "file" in accordance with the present invention could include these features.

A "file system" is contemplated to be any suitable computer operating system for storing, manipulating, processing, displaying, editing and performing any other file manipulation or file action on a digital data file that will be readily understood by the skilled person. In at least one embodiment, it is contemplated that the file system does not support custom injected data, alternative data streams or extended file attributes on each digital data file handled by the file system, however alternative arrangements are also contemplated and will readily be understood by the skilled person. In at least one embodiment, the file system is a standard operating system environment as will be readily understood by the skilled person.

The present invention includes a system having an agent and a server. In at least one embodiment it is contemplated that the agent monitors file operations performed by the system or a user on the devices in which the agent is installed. In at least one embodiment it is contemplated that an agent is a computer program operating in a file system and installed on a user device, which includes but is not limited to a personal computer, smartphone, tablet, and wearable mobile device technology, among any other arrangement that will be readily understood by the skilled person. It is also contemplated that the agent could be a remotely installed, 'cloud' based program that has network access to the particular user device.

Further, it is contemplated that a server will be readily understood by the skilled person as a central data collection server having a network communication link between the device that stores information about end user file operations involving files on a particular device having network access to the server.

The agent is adapted to detect the creation of a particular file and further determine that particular file's location on a user device. Once this location has been obtained, the agent can assigns a unique location identifier, which can be stored, either temporarily or permanently, locally in the agent or elsewhere on the device or remotely on the server.

In some embodiments, it is contemplated that the agent can communicate a unique location identifier to the server and the server can then assigns a unique identifier to the particular file, which can be stored, either temporarily or permanently, locally in the agent or elsewhere on the device or remotely on the server. In some embodiments, it is contemplated that the unique location identifier is separate from the unique file identifier and in other embodiments it is contemplated that the unique location identifier is the unique file identifier, and vice versa.

The agent also can continually monitor the device to detect when any file on the device is subject to a "loss vector" operation. For the purposes of the present invention, a loss vector operation is contemplated to include, but is not limited to, a browser upload, file transfer between devices, an access request, visual display, an email attachment, a USB copy, among any other file operation that indicates that a file may be copied, created, lost, updated, changed or otherwise manipulated within the file environment. In many embodiments, a loss vector operation will involve making a copy of a file as will be discussed further below.

In some embodiments, it is contemplated that an audit report is generated upon detection of a loss vector operation. An audit report can include a time associated with the loss vector operation, details of the actual loss vector operation, the identity of the user performing the loss vector operation, among other pieces of information relating to the loss vector operation that will be readily understood by the skilled person.

In some embodiments, the agent continually monitors the device and tracks loss vector operations that cause a copy of a file to be created or updated. In these embodiments it is contemplated that the agent is adapted to identify a copy or updated file by its current location on the user device. Once this location has been obtained, the agent can assign a unique copy location identifier and/or a unique copy identifier, which can be stored, either permanently or temporarily, locally in the agent or elsewhere on the device or remotely on the server.

When the loss vector operation that occurs results in a copy or update being made, it is contemplated that a link relationship between the originating file and the copied/updated file is created and stored on the system. It is contemplated that the link relationship can be stored remotely on the server, locally on agent or elsewhere on the device, among any other arrangement that will be readily understood by the skilled person. In this way, the system can track all related files that are copies and updates of an initial, originating file through this link relationship.

When a file is transferred from a first device running the agent to a second device running the agent, the agent on the second device consults the server to determine whether there is a unique file identifier, unique location identifier, copy location identifier and/or a unique copy identifier that has been stored on the server in order to know if the transferred file (which could be a source file or a file copy) was previously known to the system.

When a user performs a loss vector operation on the transferred file, the agent on the second device is adapted to detect this loss vector operation and can generate an audit record associated with the performed loss vector operation. The audit record can be stored remotely on the server, locally on the agent or elsewhere on the device, among any other arrangement that will be readily understood by the skilled person.

It is contemplated that the audit record could include a time associated with the loss vector operation, details of the actual loss vector operation, the identity of the user performing the loss vector operation, among other pieces of information relating to the loss vector operation that will be readily understood by the skilled person.

In this way, the system is adapted to maintain a database of unique (file/copy) location identifiers, unique (file/copy) identifiers, audit records and link relationships associated with a particular file. Therefore, these audit records, unique identifiers, unique location identifiers and link relationships can be used to create a chain of custody for any file in the system.

Turning to FIG. 1, at least one embodiment of the present invention is illustrated wherein the present method is initiated when a source file is created (1) on a source file system. The source file is subsequently detected by a source agent running on the source system (2). It is contemplated that the detection (2) can occur in a wide variety of ways depending on the needs of the instant application as will be readily understood by the skilled person and as discussed above.

For example, detection (2) could occur upon initial creation of the source file. Alternatively, detection (2) could happen when the source client checks the source file system at regularly programmed intervals for newly created files. It is also contemplated that the source agent could detect the present of the source file when the source agent is installed on, or is provided network access to, the source file system.

It is contemplated that the source agent can be a program installed directly on the source file system or alternatively can be a program that runs on a remote server and is provided direct communication to the source file system through a network. It is contemplated that detection (2) could be a detection message that is "pushed" to the source agent or alternatively the source agent can take periodic inventory of all source files on the source file system to detect individual source files.

Once a source file has been detected (2) on the source file system, the location of that source file is retrieved by the source agent and communicated to a server. The server is contemplated to be any suitable storage database for storing digital data having network access to the source file system and that can be located remotely or alternatively can be located on the same physical system as the source file system.

Following communication of the source file location to the server, a unique source file identifier is assigned to the source file (3). This unique source file identifier is cached in the source agent and also stored in the server for future retrieval. In this way, a unique identifier is associated with each source file detected by the source agent, and this unique source file identifier can be used in future actions involving the file. It is contemplated that in at least one embodiment the unique source file identifier further includes the file location retrieved by the source agent.

Next, a user initiates a loss vector operation (4) involving the source file on the source file system. As discussed above, it is contemplated that a loss vector operation can be any file operation where the file may be created, copied, lost, updated, displayed, changed or otherwise manipulated within the file environment as will be readily understood by the skilled person. In this embodiment, the loss vector operation involves creating a file copy of the source file by a user on the source file system.

In this embodiment, the present method then proceeds to detect the loss vector operation (5) by detecting the creation of the file copy of the source file. In this embodiment, upon detection of the file copy the location of the file copy is communicated to the server. The server then proceeds to assign a unique copy identifier to the file copy (6) while the unique copy identifier is also locally cached in the source agent. It is further contemplated that the copy identifier can also be stored locally or any other suitable storage location that has suitable network access to the source file system.

It is also contemplated that upon detection of the loss vector operation (5) an audit record can be generated by the source agent and communicated to and stored by the server for future retrieval. It is contemplated that the audit record could include a time associated with the loss vector operation, details of the actual loss vector operation, the identity of the user performing the loss vector operation, among other pieces of information relating to the loss vector operation that will be readily understood by the skilled person. It is also contemplated that the audit record is stored, either permanently or temporarily, on the agent or elsewhere on the source file system as will be readily understood by the skilled person.

The source agent then creates a link relationship (7) between the source file and the file copy. It is contemplated that the link relationship identifies the relationship between the source file and the file copy. This link relationship can be communicated to and stored on the server for future retrieval, however is also contemplated that the link relationship can be stored locally, either permanently or temporarily, on the agent or elsewhere on the source file system as will be readily understood by the skilled person.

At this point, the source file and the file copy are each individually identified by way of unique identifiers and the relationship between the two is catalogued by way of the link relationship. In this way, a user can retrieve a variety of chain of custody data related to the initial source file in the context of the source file system from a remote server (or alternatively, from local storage).

The present method then proceeds to the next step wherein it is contemplated that a new user initiates an additional loss vector operation by copying the file copy from the source file system to a destination file system that is also running the agent (8). As the file copy is copied over to the new system to become a destination copy, the destination agent detects this additional loss vector operation (9) and immediately checks the server (or alternatively, a local storage source in communication with the network) to determine if a unique identifier (such as a unique copy identifier or a unique source file identifier as discussed above) has been created and stored on the network.

Further, as the loss vector operation is detected (9) it is contemplated that an audit record can be generated by the destination agent and communicated to and stored by the server for future retrieval.

At the same time as the agent checks for a unique identifier for the file copy, a destination file copy is saved to the destination file system (10) that corresponds to the file copy. Once the destination file copy has been created, the destination agent then detects this further loss vector operation (11) and communicates the location of the destination file copy to the server. It is also contemplated that the location can be stored, either temporarily or permanently, locally on the agent or any other suitable storage location that has suitable network access to the source file system.

Once the location of the destination file copy has been communicated to the server (11) the server can then assign a unique destination file copy identifier to the destination file copy (12). This unique destination file copy identifier can then be stored by the server for future retrieval and cached in the destination agent for temporary storage. It is also contemplated that the unique destination file copy identifier can be stored, either temporarily or permanently, on any other suitable storage location that has suitable network access to the source file system.

Once a unique destination file copy identifier has been created for the destination file copy, the agent can then create a link relationship between the source file copy and the destination file copy (13). This link relationship can then be communicated to and stored by the server for future retrieval. It is also contemplated that the link relationship can be stored locally, either permanently or temporarily, on the agent or elsewhere on the source or destination file systems as will be readily understood by the skilled person.

In this way, a complete chain-of-custody report can be generated from the various link relationships, loss vector audit reports, and unique identifiers (14) that are stored by the server or elsewhere on the network. Therefore, it is contemplated that the custody report can provide information relating to all file operations that have been performed on any or all of the source file, file copy or destination file copy in order to create an automatically tracked chain of custody report, including information such as, but not limited to, information related to user access to the file (including identification of user and time of access), information related to file operations performed on the files, location of the files, number of copies of the files in existence, link relationship between the different files, among other arrangements that are readily understood by the skilled person.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

The embodiments of the invention in which an exclusive property or privilege is claimed are defined as follows.

What is claimed is:

1. A method of generating a chain of custody report, said method comprising:
    continually monitoring a source file system for loss vector operations by an agent running on said source file system or provided to the source file system through a network;
    detecting a loss vector operation associated with a source file in the source file system by said agent, wherein said loss vector operation causes a copy of data of the source file to be created, wherein said source file has a unique source file identifier and a unique source file location identifier, wherein said source file identifier is distinct from said source file location identifier;
    identifying, by said agent, said copy by its location and assigning a unique copy location identifier and a unique copy identifier to said copy, wherein said copy file identifier is distinct from said copy file location identifier;
    generating, by said agent, an audit record comprising time associated with the loss vector operation and details of the loss vector operation;
    establishing, by said agent, a link relationship between the source file and said copy which identifies the relationship between the source file and said copy; and
    generating a chain-of-custody report from the source file identifier, the source file location identifier, the copy file identifier and copy file location identifier, audit records and link relationships, wherein said chain-of-custody report is a chronological documentation of loss vector operations associated with said digital data.

2. The method of claim 1, wherein prior to detecting the loss vector operation, said source file is detected by said agent, said source file's location is determined and said source file identifier and said unique source file location identifier are assigned to the source file.

3. The method of claim 2, wherein said source file is detected by said agent, upon initial creation of said file.

4. The method of claim 2, wherein said source file is detected at regularly programmed intervals.

5. The method of claim 1, wherein upon detection of the source file, the location of said source file is retrieved by said agent and communicated by said agent to a server having network access to said source file system.

6. The method of claim 1, wherein said source file location identifier and/or source file identifier and/or said source file is communicated by said agent to said server.

7. The method of claim 1, wherein location of said copy is communicated by said agent to a server having network access to said source file system.

8. The method of claim 1, wherein said copy location identifier and/or copy identifier is communicated by said agent to said server.

9. The method of claim 1, wherein said method comprises:
    monitoring a destination file system for loss vector operations by a destination agent running on said destination file system or provided to the destination file system through a network; and
    detecting a further loss vector operation, wherein said further loss vector operation causes a copy of the copy to be created on said destination file system.

10. The method of claim 9, further comprising:
    identifying, by said destination agent, said copy of the copy by its location and assigning the unique copy location identifier and unique copy identifier to said copy of said copy, wherein said copy identifier is distinct from said copy location identifier;
    generating, by said destination agent, a further audit record comprising time associated with the further loss vector operation and details of the further loss vector operation; and
    establishing, by said destination agent, a link relationship between the copy and said copy of said copy which identifies the relationship between the copy and said copy of said copy.

11. The method of claim 1, wherein said copy is a USB copy.

12. The method of claim 1, wherein said copy is an email attachment.

* * * * *